United States Patent [19]

Joy

[11] Patent Number: 5,207,567
[45] Date of Patent: May 4, 1993

[54] PUMP WITH INTEGRAL SUMP
[75] Inventor: Theodore J. Joy, Mishawaka, Ind.
[73] Assignee: Allied-Signal Inc., Morristown, N.J.
[21] Appl. No.: 944,614
[22] Filed: Sep. 14, 1992
[51] Int. Cl.⁵ .................... F04B 11/00; F04B 39/10; B60T 8/40
[52] U.S. Cl. ................... 417/540; 417/570; 303/116.4
[58] Field of Search ........ 417/540, 570, 569; 303/116.4, 303

[56] References Cited
U.S. PATENT DOCUMENTS

| | | | |
|---|---|---|---|
| 2,371,054 | 3/1945 | Le Clair | 417/570 |
| 4,381,125 | 4/1983 | Wilson | 303/116.4 |
| 4,387,934 | 6/1983 | Farr | 303/116.4 |
| 4,887,870 | 12/1989 | Siegel | 417/540 |

Primary Examiner—Richard A. Bertsch
Assistant Examiner—Roland McAndrews
Attorney, Agent, or Firm—Larry J. Palguta; Ken C. Decker

[57] ABSTRACT

The pump (10) with integral sump (100) comprises a pump body (12) having therein a bore (18) in which is disposed a resiliently biased and reciprocating pump piston (30). One end of the pump piston (30) is received within an end opening (22) of the bore (18) and a central opening (42) of an outlet member (40). The outlet member (40) includes outlet valve openings (45) each housing a coil spring (41) or elastomeric member (41A) biasing a valve member (43) against a valve seat (49). The valve openings (45) communicate with an interior opening or pumping chamber (44) of the outlet member (40) wherein a spring member (46) biases an inlet valve (60) against an inlet seat plate (70). The inlet seat plate (70) has a central opening (72) communicating on one side with a sump chamber (110). A sump sleeve (90) is located sealingly within the bore (18) and abuts the inlet seat plate (70), contains therein a slidable sump piston (98) biased by a sump spring (96), and has a plurality of inlet openings (92). Reciprocating movement of the pump piston (30) draws fluid through the inlet opening (92), sump chamber (110), central opening (72) of the inlet seat plate (70), and past the retracted inlet valve (60) so that after closure of the inlet valve (60) when the pump piston is at dead center, subsequent movement of the pump piston (30) into the bore (18) causes the fluid to be pumped past the valve seats (49) and valve members (43) and through outlet openings (48).

21 Claims, 1 Drawing Sheet

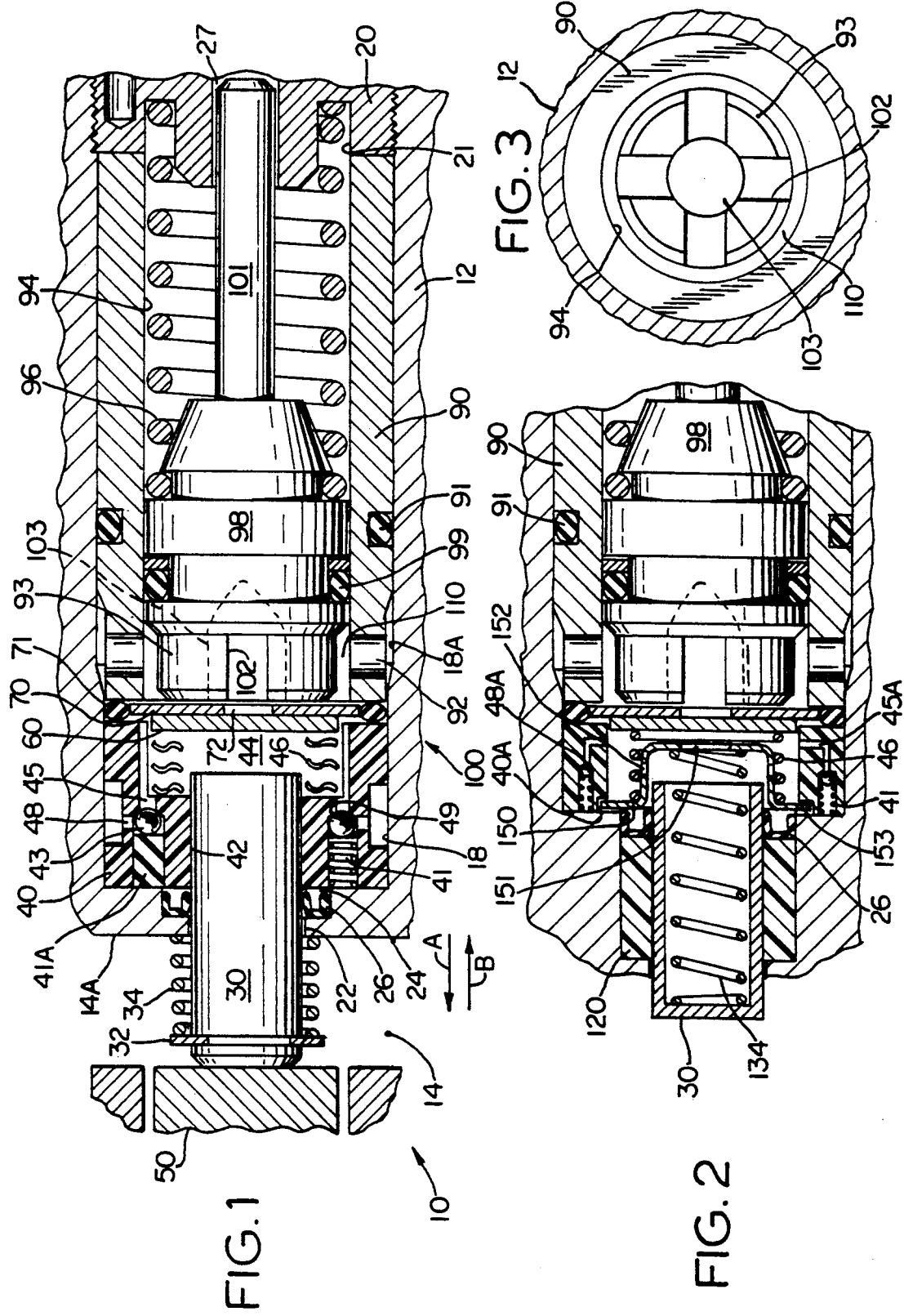

PUMP WITH INTEGRAL SUMP

The present invention relates generally to a pump for pumping high pressure fluid, and in particular to an antilock braking system pump with an integral sump.

Many antilock braking systems utilize a pump to create pressure within the system during operation. Joy et al U.S. Pat. No. 4,861,234 illustrates one type of pump assembly for providing high pressure fluid within the system. However, such systems also require the presence of one or more sumps to retain excess fluid, even temporarily, within the system. The sump is connected with the inlet side of the pump so that the excess fluid can be absorbed directly by the pump and transmitted to the system. It is highly desirable to provide a pump assembly which includes an integral sump, and thereby decrease the number of drilled passageways to reduce hydraulic line losses and decrease the number of corresponding plugs to accomplish the hydraulic connection between the sump and pump inlet. Additionally, the combined structure of a pump and sump can reduce the number of parts, cost, size, and weight of the assembly, while improving the volumetric efficiency and the inlet low pressure capabilities of the pump. Other advantages that are desirable are a decrease in the clearance volume for the piston in the pumping chamber volume, and a reduction of tight machining tolerances so that parts do not have to be fitted selectively during manufacturing and assembly. Additionally, a modulator housing which contains the pump can be reduced in size because both the sump and pump can be housed within the same bore.

The present invention provides solutions to the above problems by providing in a pump assembly, a bore having an end opening receiving slidably therein a pump piston, the pump piston biased by spring means for reciprocating movement relative to the end opening and extending into an outlet member disposed adjacent the end opening, the outlet member including at least one outlet valve opening containing therein resilient means biasing outlet valve means against an outlet valve seat, a spring member disposed within the bore and biasing an inlet valve against an inlet seat plate, the inlet seat plate having a through opening, a sump sleeve disposed within said bore and capturing said inlet seat plate between the sump sleeve and said outlet member, the sump sleeve having a longitudinal opening receiving slidably therein a sump piston and defining a sump chamber with the sump piston and inlet seat plate, a sump spring in the bore and biasing aid sump piston toward said inlet seat plate, and an inlet opening in said sump sleeve, so that reciprocating movement of the pump piston causes fluid to be sucked through the inlet opening and into the sump chamber, through the through opening and around the inlet valve, and pumped through the outlet valve opening via the valve seat and outlet valve means.

The invention is described in detail below with reference to the drawings which illustrate two embodiments in which:

FIG. 1 is a section view of the pump assembly with integral sump in accordance with the present invention;

FIG. 2 is a section view of the pump assembly with an alternative embodiment for housing the spring that biases the piston; and FIG. 3 is an end view of the integral sump and sump piston with inlet means in accordance with the present invention.

The pump assembly with integral sump of the present invention is indicated generally by reference numeral 10 in FIG. 1. Pump assembly 10 comprises housing or body 12 having drive shaft opening 14 in which is located eccentric drive member 50 connected with a not shown motor. Drive shaft opening 14 communicates with bore 18 closed at one end by end plug member or means 20 and at the other end having end opening 22 communicating with drive shaft opening 14. Adjacent opening 14, bore 18 includes radially recessed portion 24 containing therein C-shaped or lip seal 26 located sealingly about reciprocating pump piston 30. Reciprocating pump piston 30 includes snap ring or abutment 32 providing a seat for spring means 34 extending between snap ring 32 and wall 14A of opening 14. Piston 30 is biased into engagement with eccentric drive member 50 which rotates and effects reciprocating movement of piston 30 relative to body 12 and bore 18. Bore 18 extends radially to enlarged bore section 18A which includes sump chamber 110 and a not shown inlet passage that provides fluid from a not shown antilock braking system. Located within bore 18 is end or outlet member 40 comprising a generally annular shaped member having central opening 42 through which extends slidably piston 30. Central opening 42 communicates with interior opening 44 in outlet member 40 which houses spring member 46. Spring member 46 may comprise either a coil spring or a wave form spring which is seated against shoulder 47 of end member 40 and biases pump inlet valve 60 against inlet seat plate 70. Inlet seat plate 70 includes central opening 72 for fluid flow therethrough. End member 40 includes at least one, and preferably a plurality (as shown) of longitudinal passages or outlet valve openings 45 which communicate with outlet openings 48 and interior opening 44 by means of outlet valve seats 49 and ball outlet valve means 43. Located within each opening 45 is coil spring 41 or alternatively (as shown in the upper portion of FIG. 1), a resilient integral elastomeric member 41A which biases valve means 43 against seat 49 and also provides sealing engagement with end member 40 so that expelled high pressure fluid can not flow back to interior opening 44. Each opening 45 includes at least one outlet opening 48 which communicates with a not shown outlet passage in body 12.

Located about inlet seat plate 70 is seal 71 which engages sealingly the surface of bore 18. Sump 100 includes sump sleeve 90 located within bore 18 and abutting inlet seat plate 70 and seal 71 so that each is trapped and held axially in place between sump sleeve 90 and end member 40. Sump sleeve 90 includes a plurality of radially extending inlet openings 92 which communicate the not shown inlet passage in body 12 with through longitudinal opening 94. End plug means 20 abuts sump sleeve 90 and retains sleeve 90, seal 71, inlet seat plate 70, and end member 40, within bore 18. End plug means 20 includes recess 21 providing a seat for sump spring 96 which biases sump piston 98 toward and into engagement with inlet seat plate 70. Piston 98 includes thereabout a seal 99 and a piston shaft 101 received within end passage 27 which provides slidable guidance for sump piston 98. Sump piston 98 includes star-shaped end radial opening 102 which converges radially toward the center of piston 98 to communicate with central cavity 103 so that fluid can flow through the inlet openings 92, into the center of end 93 of sump piston 98, and to central opening 72 of inlet seat plate 70. Typically, sump chamber 110 (which is defined by sump piston 98, seal 99, sump sleeve 90, sleeve seal 91, seal 71 and inlet seat plate 70) would have some fluid stored therein so that sump piston 98 would be in a retracted position to be disposed axially away from and out of engagement with inlet seat plate 70.

The pump assembly with integral sump of the present invention operates to effect reciprocating motion of pump piston 30 by means of rotating eccentric drive member 50. As pump piston 30 is retracted in the direction of arrow A under the biasing force of spring means 34, fluid within sump chamber 110 is drawn through central opening 72 and past inlet valve 60 and into interior opening 44. The movement of piston 30 in the direction of arrow A causes a suction within interior opening 44 so that inlet valve 60 is retracted away from inlet seat plate 70 and fluid is drawn through central opening 72 and into interior opening 44. When piston 30 reaches its bottom dead center position, inlet valve 60 is biased toward the right in FIG. 1 by spring member 46 so that fluid flow through central opening 72 is blocked. As piston 30 is moved toward the right in the direction of arrow B as a result of rotation of drive member 50, the movement of piston 30 into interior opening 44 forces fluid against outlet valve means 43 to move them away from outlet valve seats 49 and force fluid outwardly through outlet openings 48 and to the one or more not shown outlet openings within body 12.

Referring to FIG. 2, an alternative embodiment of the pump assembly with integral sump is illustrated. If it is desirable that spring means 34 not be located within drive shaft opening 14, the pump piston 30 may be biased by means of return spring means 134 which is located interiorly of piston 30. Piston 30 extends into bore 18 and slides in piston guide bushing and seal backup member 120, extends through C-shaped or lip seal 26, and houses return spring means 134 which abuts spring retainer 150. Piston spring retainer 150 is a generally cup-shaped member which includes central opening 151 and a plurality of radial openings 152 for fluid flow therethrough, and a radially extending flange 153 located within recess 40A of end member 40. Flange 153 provides a seat for spring member 46. In the embodiment of FIG. 2, the piston assembly with integral sump operates in the same manner as described above for the embodiment of FIG. 1, except that the return spring means of the pump piston is located interiorly of the bore and pump piston. Additionally, end member 40 includes radially extending openings 45A communicating with outlet valve openings 48A. All other aspects of the structure and function of the embodiment of FIG. 2 are generally the same as described above for FIG. 1.

The pump assembly with integral sump of the present invention provides a substantial number of advantages over prior arrangements of pump assemblies and sumps. The entire assembly provides for a reduction in weight because the sump piston has material removed from each end thereof as compared to prior sump pistons, a common end plug is utilized to retain both the pump assembly and sump, and modulator body material is reduced because both the pump assembly and sump are housed together within one location or the same bore. A size reduction in the modulator housing is realized because both the pump assembly and sump are housed together and utilize a common end plug. Because of the reduction in the modulator material (typically aluminum) and the number of parts, a cost reduction is realized. With the decrease in the total part count, there is provided an increased reliability for the pump assembly and sump operation. Because the C-shaped lip seal is located about the pump piston, there should be a reduction in leakage around the pump piston which means that the volumetric efficiency of the pump should be improved and thus a smaller pump motor may be utilized. There should be an improvement in the pump inlet low pressure capabilities as a result of the presence of larger inlet openings 92, the presence of a volume of fluid directly at the pump inlet/suction valve, the use of the C-shaped or self energizing seal that allows the pumping or interior opening 44 to produce a vacuum instantaneously during the return or retraction stroke of the pump piston, the decreased volume of fluid in the pumping chamber (interior opening 44), and the reduced inlet line length from the sump to the pump inlet or central opening 72. Because pump piston 30 approaches very closely inlet valve 60, there should be produced a hydraulic pulling action that assists in the opening of inlet valve 60 during the suction or retraction stroke. There should be realized a decrease in the clearance volume (the clearance/displacement ratio) for the pump piston in the pump chamber volume. A reduction in the clearance/displacement ratio will help the pump prime itself or clear itself of vapors if it should become vapor-locked. By utilizing the C-shaped or self-energizing lip seal about pump piston 30, tolerances on the piston and housing can be reduced and thus eliminate any select fitting processes required to fit the piston within end opening 22 as a result of high tolerances. A needle bearing can be utilized for the solid piston or a hollow needle bearing capped off at one end with the return spring guided on the inside. Both of these types of needle bearings would reduce costs and provide a hardened outside diameter wear surface. Finally, the number of drilled passageways and plugs required in the modulator body which has a sump located separately from the pump assembly are eliminated as a result of the sump becoming an integral part of the pump assembly.

I claim:

1. In a pump assembly, a bore having an end opening receiving slidably therein a pump piston, the pump piston biased by spring means for reciprocating movement relative to the end opening and extending into an outlet member disposed adjacent the end opening, the outlet member including at least one outlet valve opening containing therein resilient means biasing outlet valve means against an outlet valve seat, a spring member disposed within the bore and biasing an inlet valve against an inlet seat plate, the inlet seat plate having a through opening, a sump sleeve disposed within said bore and capturing said inlet seat plate between the sump sleeve and said outlet member, the sump sleeve having a longitudinal opening receiving slidably therein a sump piston and defining a sump chamber with the sump piston and inlet seat plate, a sump spring in the bore and biasing said sump piston toward said inlet seat plate, and an inlet opening in said sump sleeve, so that reciprocating movement of the pump piston causes fluid to be sucked through the inlet opening and into the sump chamber, through the through opening and around the inlet valve, and pumped through the outlet valve opening via the valve seat and outlet valve means.

2. The pump assembly in accordance with claim 1, wherein said resilient means biasing said outlet valve means comprises a coil spring.

3. The pump assembly in accordance with claim 1, wherein the resilient means biasing said outlet valve means comprises an integral elastomeric member which sealingly engages said outlet member.

4. The pump assembly in accordance with claim 1, further comprising a lip seal located about said pump piston and adjacent said end opening.

5. The pump assembly in accordance with claim 1, wherein an end of the pump piston located exteriorly of said bore includes abutment means for the spring means which is located between the abutment means and a radial wall adjacent the end opening.

6. The pump assembly in accordance with claim 1, wherein the sump piston includes a longitudinal stem received within an end passage of end plug means in the bore.

7. The pump assembly in accordance with claim 6, wherein said sump piston includes at an end adjacent the inlet opening a generally star-shaped opening which permits fluid to flow radially into a central cavity of the sump piston.

8. The pump assembly in accordance with claim 1, further comprising sealing means disposed about said sump sleeve to effect sealing engagement with a surface of the bore.

9. The pump assembly in accordance with claim 8, wherein said spring member biasing said inlet valve comprises a wave spring.

10. The pump assembly in accordance with claim 8, wherein the spring member biasing the inlet valve comprises a coil spring.

11. The pump assembly in accordance with claim 1, further comprising a pump piston retainer located interiorly of said bore and about an end of the said pump piston disposed within the bore such that the piston retainer provides a seat for said spring means and includes radial openings for the flow of fluid toward said outlet valve opening.

12. The pump assembly in accordance with claim 11, wherein the piston retainer is a generally cup-shaped member having an outer flange which provides a seat for the spring member biasing said inlet valve.

13. The pump assembly in accordance with claim 1, wherein the inlet seat plate has disposed thereabout a seal located axially between the outlet member and sump sleeve.

14. In a pump assembly, a bore having an end opening receiving slidably therein a pump piston, the pump piston biased by spring means for reciprocating movement, an outlet member disposed adjacent the end opening and receiving the piston, the outlet member including at least one outlet valve opening containing therein outlet valve means, a spring member disposed within the bore and biasing an inlet valve against an inlet seat plate, the inlet seat plate having a through opening, a sump sleeve disposed within said bore and capturing said inlet seat plate between the sump sleeve and said outlet member, the sump sleeve having a longitudinal opening receiving slidably therein a sump piston and defining a sump chamber with the sump piston and inlet seat plate, a sump spring in the bore and biasing said sump piston toward said inlet seat plate, an inlet opening in said sump sleeve, and end plug means engaging the sump sleeve, so that reciprocating movement of the pump piston causes fluid to be sucked through the inlet opening and into the sump chamber, through the through opening and around the inlet valve, and pumped through the outlet valve opening via the valve seat and outlet valve means.

15. The pump assembly in accordance with claim 14, wherein said resilient means biasing said outlet valve means comprises a coil spring.

16. The pump assembly in accordance with claim 14, wherein the resilient means biasing said outlet valve means comprises an integral elastomeric member which sealingly engages said outlet member.

17. The pump assembly in accordance with claim 14, wherein an end of the pump piston located exteriorly of said bore includes abutment means for the spring means which is located between the abutment means and a radial wall adjacent the end opening.

18. The pump assembly in accordance with claim 14, wherein the sump piston includes a longitudinal stem received within an end passage of the end plug means.

19. The pump assembly in accordance with claim 18, wherein said sump piston includes at an end adjacent the inlet opening a generally star-shaped opening which permits fluid to flow radially into a central cavity of the sump piston.

20. The pump assembly in accordance with claim 14, further comprising a pump piston retainer located interiorly of said bore and about an end of the said pump piston disposed within the bore such that the piston retainer provides a seat for said spring means and includes radial openings for the flow of fluid toward said outlet valve opening.

21. The pump assembly in accordance with claim 20, wherein the piston retainer is a generally cup-shaped member having an outer flange which provides a seat for the spring member biasing said inlet valve.

* * * * *